(12) United States Patent
Rowe et al.

(10) Patent No.: US 7,827,200 B2
(45) Date of Patent: Nov. 2, 2010

(54) SOLUTION FOR MANAGING SERIALIZATION OF EPC IDENTIFIERS FOR USE WITH RFID TAGS

(75) Inventors: Frederick W. Rowe, Raleigh, NC (US); John K. Senegal, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 1145 days.

(21) Appl. No.: 11/457,704

(22) Filed: Jul. 14, 2006

(65) Prior Publication Data
US 2008/0041944 A1 Feb. 21, 2008

(51) Int. Cl.
*G06F 17/30* (2006.01)
(52) U.S. Cl. .................................. 707/792; 707/769
(58) Field of Classification Search .................. 707/802, 707/999.1, 769, 792
See application file for complete search history.

(56) References Cited

U.S. PATENT DOCUMENTS

| | | | |
|---|---|---|---|
| 2002/0165758 A1 | 11/2002 | Hind et al. | |
| 2002/0174025 A1 | 11/2002 | Hind et al. | |
| 2004/0070491 A1 | 4/2004 | Huang et al. | |
| 2005/0075926 A1 | 4/2005 | Liu et al. | |
| 2005/0114270 A1 | 5/2005 | Hind et al. | |
| 2005/0153729 A1 | 7/2005 | Logan et al. | |
| 2005/0253722 A1 | 11/2005 | Droms et al. | |
| 2007/0229267 A1* | 10/2007 | Traub et al. | 340/572.1 |
| 2007/0250603 A1* | 10/2007 | Suen | 709/220 |

OTHER PUBLICATIONS

D. Brock, C. Cummins, "EPC Tag Data Specification", Institute of Technology Auto ID Center 2003.*

* cited by examiner

*Primary Examiner*—Cheryl Lewis
(74) *Attorney, Agent, or Firm*—Patents On Demand, PA; Brian K. Buchheit

(57) ABSTRACT

The present invention includes a method for managing serialization of ELECTRONIC PRODUCT CODES (EPCs). The method can include a step of identifying a software system for managing Tag Data Specification (TDS) compliant EPCs. The software system can include a database containing two or more related tables. A tuple can be included for each unique nonserialized portion of an EPC ID URN. The database can utilize the nonserialized portion to manage a serialized portion of the EPC. In one embodiment, the database can use the nonserialized portion of an EPC to automatically generate the serialized portion of the EPC. Different sets of sequentially increasing (or sequentially decreasing) serial numbers (that are assigned to the associated unique nonserialized portions of the EPCs) can be associated with different nonserialized values.

17 Claims, 2 Drawing Sheets

SOLUTION FOR MANAGING SERIALIZATION OF EPC IDENTIFIERS FOR USE WITH RFID TAGS

BACKGROUND

1. Field of the Invention

The present invention relates to the field of object identification using RFID tags and, more particularly, to a solution for efficiently managing serialization of EPC identifiers.

2. Description of the Related Art

An ELECTRONIC PRODUCT CODE (EPC) is an identification scheme for universally identifying physical objects via Radio Frequency Identification (RFID) tags and other means. EPC was the creation of the MIT Auto-ID Center that is currently managed by EPCglocal Inc. The EPC scheme is designed to meet the needs of various industries, while guaranteeing uniqueness for all EPC-compliant tags. The format and contents of an EPC-compliant tag are governed by the EPCglobal Tag Data Specification (TDS).

Various retailers including WAL-MART, TARGET, and the US Department of Defense (DoD) are requiring suppliers to tag material with an EPC identifier encoded on an RFID tag in order to increase visibility of goods moving within a supply chain. This requires the generation of an EPC identifier for each case/pallet of goods shipped and potentially (if tagging is required at an item level) the generation of an EPC identifier for each item. Additionally, RFID chips are currently being implanted in pets and in some instances in humans for identification purposes. All of these applications for RFID tags having EPC identifiers can result in a huge number of identifiers that must be generated and/or managed.

To complicate matters, the TDS, a specification managed by EPCglobal, Inc., requires that each EPC identifier includes a serial number that is unique for each tagged object/location/entity or collection thereof. In order to maintain uniqueness, current versions of the TDS require that each assigned serial number can either never be reused or may only be reused after a specified time period so as to prevent potential ambiguities in ascertaining the identity of a tagged item. Further, each unique serial number is only a portion of the entire EPC identifier. It can be difficult to manage the unique serialization of EPC identifiers in addition to other EPC identifier fields. No conventional solution/technology exists to efficiently generate and manage unique serial number portions of EPC identifiers.

SUMMARY OF THE INVENTION

The present invention can be implemented in accordance with numerous aspects consistent with material presented herein. For example, one aspect of the present invention can include a method for managing serialization of ELECTRONIC PRODUCT CODES (EPCs). The method can include a step of identifying a software system for managing Tag Data Specification (TDS) compliant EPCs. The software system can include a database containing two or more related tables. A tuple can be included for each unique nonserialized portion of an EPC Identity Uniform Resource Name (ID URN). The database can utilize the nonserialized portion to manage a serialized portion of the EPC. In one embodiment, the database can use the nonserialized portion of an EPC to automatically generate the serialized portion of the EPC. Different sets of sequentially increasing (or sequentially decreasing) serial numbers (that are assigned to the associated unique nonserialized portions of the EPCs) can be associated with different nonserialized values.

Another aspect of the present invention can include a method for assigning serial numbers for EPCs. The method can include a step of mapping classification values to different serial number generation functions using at least one table of a database. A nonserial value for a nonserialized portion of an EPC ID URN can be determined. The method can also determine that a serialized portion of the EPC is needed. The database can be queried to match the determined nonserial value to one of the classification values. One of the serial number generation functions can be selected based on the query results. The selected function can generate a serial number, which is uniquely generated relative to the selected function. The generated serial number can be used in conjunction with the associated serialized portion of the EPC.

Still another aspect of the present invention can include a database structure including related tables normalized in third normal form. The tables can include an object table and a collection table, where a one-to-many relationship exists between the collection table and the object table. The object table can include an EPC field, which is a candidate key of the object table. A pure identity of a value associated with the EPC field can include a serialized portion and a nonserialized portion. The collection table can include a candidate key having a value equivalent to the nonserialized portion.

It should be noted that various aspects of the invention can be implemented as a program for controlling computing equipment to implement the functions described herein, or a program for enabling computing equipment to perform processes corresponding to the steps disclosed herein. This program may be provided by storing the program in a magnetic disk; an optical disk, a semiconductor memory, or any other recording medium. The program can also be provided as a digitally encoded signal conveyed via a carrier wave. The described program can be a single program or can be implemented as multiple subprograms, each of which interact within a single computing device or interact in a distributed fashion across a network space.

It should also be rioted that the methods detailed herein can also be methods performed at least in part by a service agent and/or a machine manipulated by a service agent in response to a service request.

BRIEF DESCRIPTION OF THE DRAWINGS

There are shown in the drawings, embodiments which are presently preferred, it being understood, however, that the invention is not limited to the precise arrangements and instrumentalities shown.

DETAILED DESCRIPTION OF THE INVENTION

Figure 1:
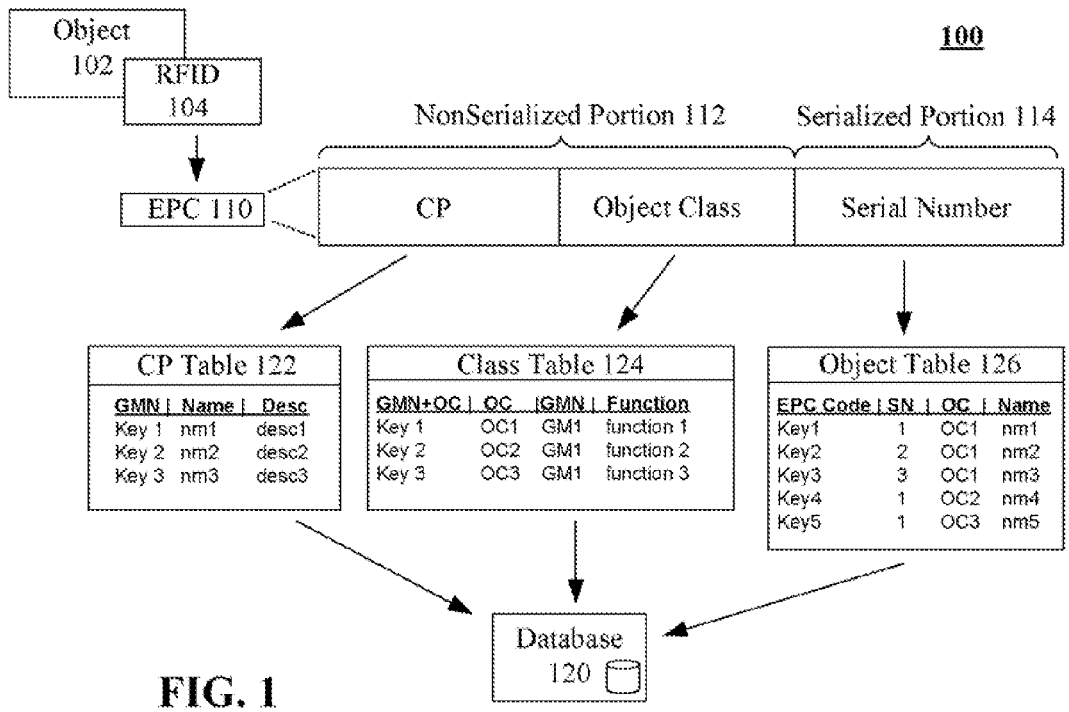
FIG. 1 is a schematic diagram of a system for managing serialization of Radio Frequency Identification (RFID) ELECTRONIC PRODUCT CODES (EPCs) in accordance with an embodiment of the inventive arrangements disclosed herein.

FIG. 1 is a schematic diagram of a system 100 for managing serialization of Radio Frequency Identification (RFID) ELECTRONIC PRODUCT CODES (EPCs) in accordance with an embodiment of the inventive arrangements disclosed herein System 100 shows an object 102 associated with RFID tag 104. The RFID tag 104 includes a digitally encoded EPC 110, which is uniquely assigned to the object 102.

Object 102 can refer to any "taggable thing," such as a person, animal, place, item, container, or collection. For example, an object 102 can include an item inventoried and/or sold by a retailer, where the RFID tag 104 and encoded EPC 110 can be used on tagged goods instead of a barcode. An object 102 can also include an animate being, such as a pet or livestock. The pet can have an embedded RFID tag 104 or chip inserted to be used to determine ownership in the event of the pet becoming lost. Additionally, the object 102 can be associated with a geographic location, where the RFID tag 104 can be used to permit interoperating electronic devices to function a specific way when proximate to the geographic location. Additionally, the object 102 can be a collection of things, such as a tagged shipping container that can be used to automatically track a status of shipped objects included in the container.

RFID tag 104 is typically a small object that can be attached or incorporated into object 102 that includes a transponder, silicon chips, and/or an antenna. An RFID tag 104 is able to respond to radio frequency queries from an RFID transceiver. RFID tags 104 can store data that is selectively transmitted to authorized RFID transceivers. RFID tags 104 can be passive devices having no internal power supply, can be semi-passive devices having a small internal battery that allows the device to be constantly powered, and/or can be active devices having internal power sources used to power integrated circuits (ICs) that generate outgoing signals.

EPC 110 is an object encoded scheme for object identification created by the MIT Auto-ID Center and currently managed by EPC global, Inc. The EPC 110 is a simple, compact "license plate" or identifier that uniquely identifies an associated object 102. The EPC is built around a basic hierarchical idea that can be used to express a wide variety of different, existing numbering systems, such as European Article Numbering-Uniform Code Council (EAN-UCC) system keys, Unique Identification (UID) codes, Vehicle Identification Number (VIN), and other numbering systems. The EPC is divided into numbers that identify manufacturer, object type, and serial number. The format and contents of an EEC-compliant tag is governed by the EPCglobal Tag Data Specification (TDS).

Many different types of EPCs 110 exist. These types include a General identifier type, five EAN-UCC types, and a DOD type. The five EAN-UCC types include a Serialized Global Trade Item Number (SGTIN) type, a Serial Shipping Container Code (SSCC) type, a Serialized Global Location Number (SGLN) type, a Global Reusable Asset Identifier (GRAI) type, and a Global Individual Asset Identifier (GIAI) type. Each type has type specific format considerations. The present invention can be utilized with any of type of EPC 110, but is not limited to the existing types of EPCs. Rather, the present invention can be used to manage serialization of any EPC that is able to be represented in an EPC ID URN format.

Regardless of the EPC type, each EPC 110 has a pure identity that includes a nonserialized portion 112 and a serialized portion 114. The pure identity is an identity associated with a specific physical or local object 102 independent of any particular encoding vehicle, such as RFID tag 104, barcode or database field. That is, the pure identity is an abstract name or number used to identity object 102 that consists of the information required to uniquely identify a specific object 102 and nothing more.

The nonserialized portion 112 of the EPC can specify a manufacturer and an object classification of object 102. Each company or manufacturer can be assigned a unique Company Prefix (CP) or General Manager Number (GMN) by the EPCglobal. The company can then use the assigned CP to define new EPC numbers. Each CP can be recorded in a database table 122. Another component of the nonserialized portion 112 can include an object classification that must be unique for a given company or CP. Object classification values can be stored in database table 124.

The serialized portion 114 of EPC 110 can be specifically associated with object 102. Combining the serialized portion 114 with the nonserialized portion 112 can result in a unique identifier for object 102. Serialized values can be stored in database table 126.

Each of the tables 122, 124, and 126 can be related tables of database 120, which can be a relational database. The tables 122-126 can be normalized in third normal form (3NF). A one-to-many relationship can exist between table 122 and table 124 and a one-to-many relationship can exist between table 124 and table 126. A CP or equivalent identifier can be a candidate key of table 122 and/or can be a foreign key of table 124.

An object classification or equivalent identifier can be combined with the CP to form a combined key for table 124. The nonserialized portion 112 can be a candidate key for table 124. In embodiments where database 120 includes records for a single company (not shown), table 122 can be excluded from database 120 and the object classification can be a candidate key for table 124.

An object serial number or equivalent identifier, which includes serialized portion 114, can be combined with a candidate key of table 124 to form a combined key for table 126. Accordingly, the EPC can be a candidate key of table 126.

A candidate key can be a key that uniquely identifies rows, also called tuples, in a table. Any candidate key can be used as a table's primary key. Any candidate key that is not used as a primary key is called an alternate key. Hence, a candidate key of a relation (a 3NF relation) is a set of attributes of that relation such that (A) in all instances of the relation no two distinct tuples exist with the same values for these attributes and (B) no proper subset of the candidate key exists for which (A) holds. A combined key, also called a super key, is a set of two or more attributes that combined are a candidate key of a table. A foreign key is a database field of one table that points to a candidate key in a different table.

In database 120 when a new entry is needed for table 126, the serialized portion 114 of the entry can be automatically generated based upon the nonserialized portion 112. For example, serialized portions 114 can be sequentially generated from a base number (such as one) by increasing the base number by a fixed increment (such as by one value). The automatic assignment and generation of serial numbers is not limited to a simple increasing one-up generated number, but can utilize any mathematical function or serial number generation function that results in unique numbers. Each mathematical function can in a sense assign unique numbers from a pool of unallocated numbers specific to the nonserialized portion 112.

That is, serial number generation function can be uniquely generated number for each object classification. In one embodiment, table 124 can have a field for determining which function is associated with which classification. In another embodiment, the function in table 124 can be replaced with one or more generation parameters, such as a parameter indicating a last used serial number for a given classification that are used to automatically generate unique serial numbers on a classification-by-classification basis. While serial numbers generated by different functions can be equivalent, no one function is permitted to assign the same serial number twice unless that serial number has been expressly decommissioned or the required period for the recycling of the serial number has passed. Therefore, a first serial number generation function can generate a series of serial numbers including 1, 2, 3, 4 . . . 200. A second serial number generation function can generate a series of serial numbers including 0, 2, 4, 6 . . . 200.

In one embodiment, different manufacturer divisions that produce objects having the same object classification can be assigned a subset of numbers from a number pool of unassigned numbers to ensure that unique serial numbers are always generated. For example, a serial number generation function used by a first division can sequentially assign odd serial numbers, while a different serial number generation function used by a second division can sequentially assign even serial numbers. In another example, a first division can assign serial numbers in the range of one to a million and the second division can assign serial numbers in a range of three to four million. It should be appreciated that the different divisions can be communicatively linked to a centralized system that assigns serial numbers, which would ensure that serial numbers are uniquely assigned per object classification.

Figure 2:
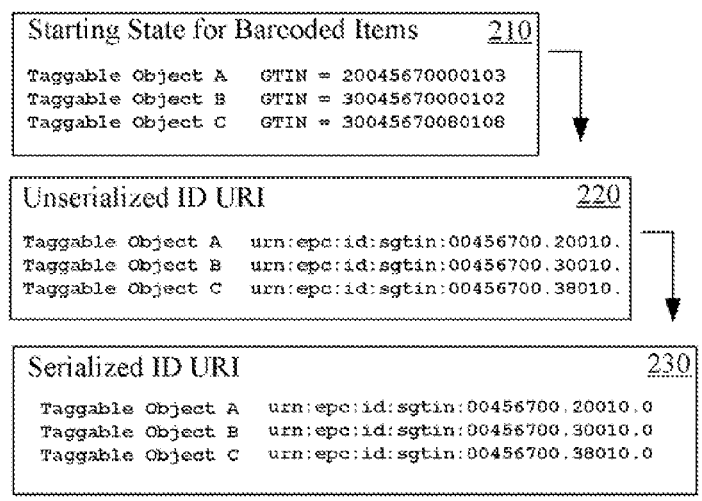
FIG. 2 shows an example where EPCs are serialized in accordance with an embodiment of the inventive arrangements disclosed herein.

FIG. 2 shows an example where EPCs are serialized in accordance with an embodiment of the inventive arrangements disclosed herein. Specifically, FIG. 2 shows how EPCs are generated for three taggable objects. Objects A, B, and C.

Initially, these objects can be barcoded using a Universal Product Code (UPC). UPC codes use Global Trade Item Numbers (GTINs). State 210 shows a starting state for barcoded items, where Object A has an associated GTIN of 20045670000103; Object B has a GTIN of 30045670000102, and Object C has a GTIN of 30045670080108.

State 220 shows values for unserialized identity Uniform Resource Identifiers (URIs) for an EPC. An identity URI is one expression, format, or representation for a pure identity. The TDS specification details a manner to convert GTINs into identity URIs. Specifically the TDS specifies:

| | |
|---|---|
| Object A | urn:epc:id:sgtin:00456700.20010.nnnnn |
| Object B | urn:epc:id:sgtin:00456700.30010.nnnnn |
| Object C | urn:epc:id:sgtin:00456700.38010.nnnnn | where nnnnn represents a serial number to be generated by any entity possessing an EPCglobal, Inc. approved unique identifier and producing taggable objects. The unserialized ID URIs for each of the objects is the URI excluding the serialized portion; which for Object A is "urn:epc:id:sgtin:00456700.20010.", for Object B is "urn:epc:id:sgtin:00456700.300.10." and for Object C is "urn:epc:id:sgtin:00456700.3 8010."

It should be noted that it would be obvious and trivial to assign a serial number from a single pool to all taggables for a given company. If assignments were performed in this fashion, identity URIs for Objects A, B, and C, would be as follows (serializing from zero in increments of one).

| | |
|---|---|
| Object A | urn:epc:id:sgtin:00456700.20010.0 |
| Object B | urn:epc:id:sgtin:00456700.30010.1 |
| Object C | urn:epc:id:sgtin:00456700.38010.2 |

If size of a serial number was not an issue, this simple serial assignment system could function for a company. Unfortunately, size of a serial number is limited because of physical memory constraints of an RFID tag. Therefore it is important to manage serial numbers on products in a manner that avoids exhausting all available numbers. For example, a 64-bit RFID tag that uses the above simple assignment methodology would provide two to the twenty fifth power or 33,554,432 potential serial numbers based on the number of bits (25) allocated to the serial number portion of a SGTIN identity URI. If the company annually ships twenty million units of taggable items a year, the available pool of serial numbers for URIs would be exhausted in under a year and a half.

For this reason, the present invention teaches that a serialized portion of EPCs are to be managed and allocated on a classification-by-classification basis, where each classification is based upon the unserialized portion of the EPC.

As shown in stage 230, a serialized identity URI automatically assigned to Object A is "urn:epc:id:sgtin:00456700.20010.0", the identity URI for Object B is "urn:epc:id:sgtin:00456700.30010.0", and the identity URI for Object C is "urn:epc:id:sgtin:00456700.38010.0." Consequently, each classification of goods can have 33,554,432 potential serial numbers assuming 64-bit RFID tags are used as described above.

Accordingly, serialized portions of EPCs can be automatically assigned based upon a taggable classification defined by a particular EPC type. The nonserialized portion of the EPC remains constant for a given taggable class. The uniqueness of the unserialized ID URI allows for lifecycle management techniques to be applied to EPCs. For example, previously assigned serial numbers can be deleted, deallocated, or unassigned once they are no longer needed. Deallocated serial numbers can be re-assigned to new objects as needed. Another lifecycle management technique can allow for blocks of serial numbers to be generated and handed out at once, which can be a significant advantage for many supply chain processes.

Figure 3:
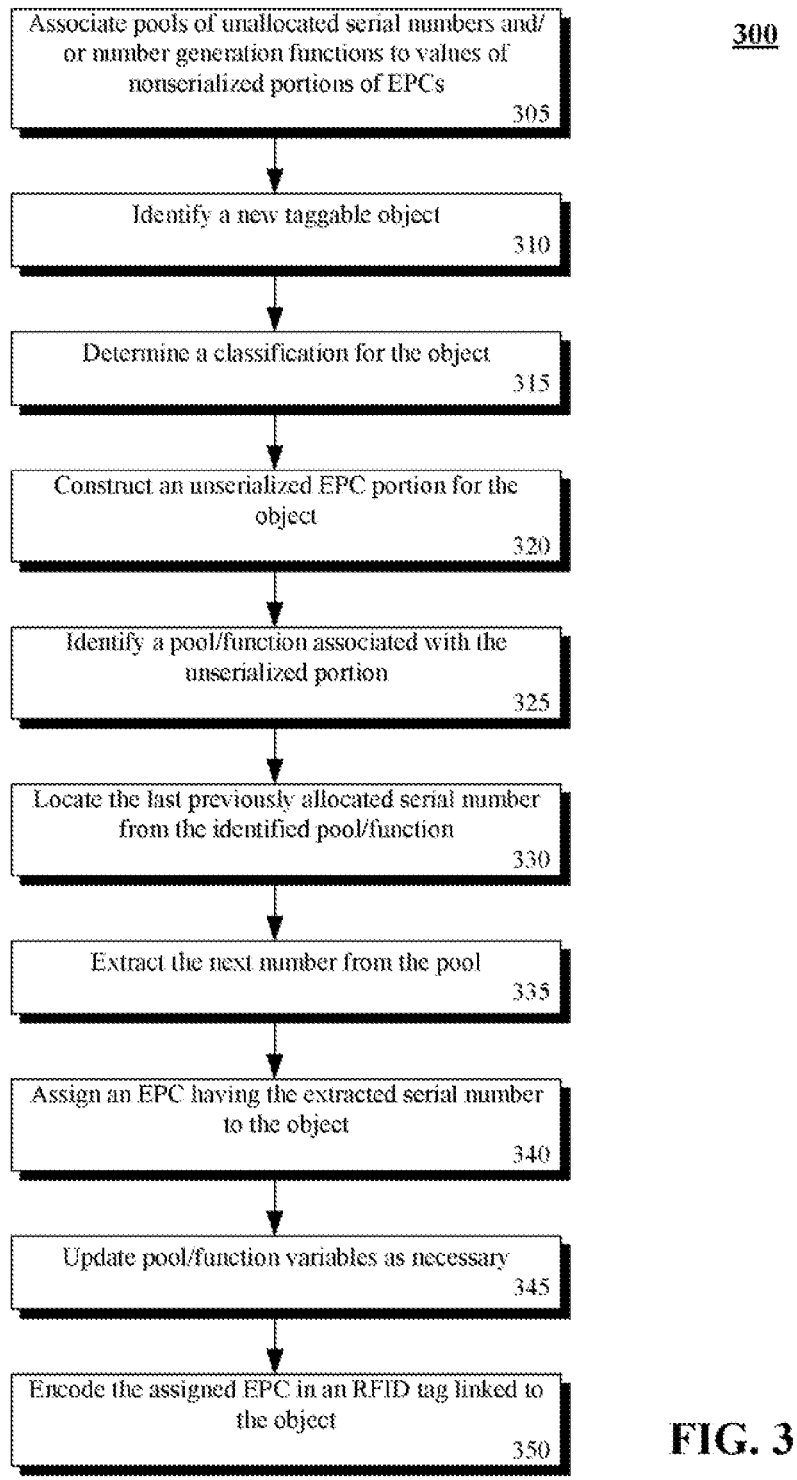
FIG. 3 is a flow chart of a method for serializing EPCs in accordance with an embodiment of the inventive arrangements disclosed herein.

FIG. 3 is a flow chart of a method 300 for serializing EPCs in accordance with an embodiment of the inventive arrangements disclosed herein. Method 300 can begin in step 305, where multiple pools of numbers and/or number assignment functions can be associated with values for nonserialized portions of EPCs. In step 310, a new taggable object can be identified that needs an EPC. In step 315, a classification for the new object can be determined. In step 320, an unserialized portion of the EPC can be constructed from the classification information, in step 325, a pool of numbers and/or a number assignment function associated with the unserialized portion can be identified. In step 330, a last previously allocated serial number in the identified pool can be located. In step 335, the next unallocated serial number can be extracted from the pool and used as the serialized portion of the EPC. In step 340, the new EPC can be assigned to the new taggable object. In step 345, variables associated with the pool or function used to generate the assigned number can be updated to ensure that the assigned serial number is not reassigned to a different object having the same unserialized portion of an EPC. In step 350, the assigned EPC can be encoded into an RFID tag that can be physically linked to the object.

The present invention may be realized in hardware, software, or a combination of hardware and software. The present invention may be realized in a centralized fashion in one computer system or in a distributed fashion where different elements are spread across several interconnected computer systems. Any kind of computer system or other apparatus adapted for carrying out the methods described herein is suited. A typical combination of hardware and software may be a general purpose computer system with a computer program that, when being loaded and executed, controls the computer system such that it carries out the methods described herein.

The present invention also may be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention may be embodied in other forms without departing from the spirit or essential attributes thereof. Accordingly, reference should be made to the following claims, rather than to the foregoing specification, as indicating the scope of the invention.

What is claimed is:

1. A method for managing serialization of ELECTRONIC PRODUCT CODES (EPCs) comprising:
   identifying a software system for managing Tag Data Specification (TDS) compliant EPCs, said software system having a database containing a plurality of related tables;
   including a tuple for each of the EPCs within one of the tables;
   for each tuple, determining a nonserialized portion of an EPC associated with the tuple; and
   the database utilizing the nonserialized portion to manage a serialized portion of the EPC, wherein each of the EPCs is formatted as a Uniform Resource Name (URN), and wherein the nonserialized portion is a portion of the URN exempting the serial number portion of the URN.

2. The method of claim 1, further comprising:
   digitally encoding the EPC into a Radio Frequency Identification (RFID) tag; and
   using the RFID tag to uniquely identify an object to which the RFID tag is physically linked.

3. The method of claim 1, further comprising the step of:
   the database utilizing the nonserialized portion to automatically generate the serialized portion of the EPC.

4. The method of claim 3, wherein different generation functions are used by the database, which are selected based upon a value of the nonserialized portion.

5. The method of claim 1, wherein the nonserialized portion is a candidate key for another one of the tables.

6. The method of claim 1, wherein the plurality of related tables are in third normal form.

7. The method of claim 1, wherein each of the tuples includes a field for the nonserialized portion, which is used as a foreign key.

8. The method of claim 1, wherein each of the tuples includes a field for the nonserialized portion and a field for a serialized portion that together are a compound key.

9. The method of claim 1, further comprising:
   establishing a plurality of pools of unassigned serial numbers;
   selecting one of the pools based upon the nonserialized portion; and
   automatically assigning a value from the selected pool for the serial portion.

10. The method of claim 1, further comprising:
    establishing a plurality of mathematical functions, each function including an ordered set of unique numbers;
    mapping different values for nonserialized portions of the EPC to different ones of the mathematical functions;
    based upon the nonserialized portion, selecting a mapped one of the mathematical functions;
    utilizing the selected mathematical function to automatically generate the serial portion; and
    increasing a parameter associated with the selected mathematical function to ensure the function will not regenerate the generated serialized portion in the future.

11. The method of claim 1, wherein said steps of claim 1 are steps performed by at least one machine in accordance with at least one computer program having a plurality of code sections that are executable by the at least one machine.

12. A method for assigning serial numbers for ELECTRONIC PRODUCT CODES (EPCs) comprising:
    mapping a plurality of classification values to different serial number generation functions using at least one table of a database;
    determining a nonserial value for a nonserialized portion of an EPC, wherein a serialized portion of the EPC is needed;
    querying the database to match the determined nonserial value to one of the classification values;
    using results from the querying step to automatically select an associated one of the serial number generation functions;
    using the selected serial number generation function to generate a serial number, wherein the generated serial number is uniquely generated relative to the selected serial number generation function;
    using the generated serial number as a serialized portion of the EPC, and
    utilizing the database to manage the EPC and a plurality of other EPCs, wherein EPCs are stored in a database table having a field for the nonserial value, wherein the field is a foreign key linking the database table to a different database table, and wherein the tables of the database are in third normal form.

13. The method of claim 12, further comprising:
    digitally encoding the EPC into a Radio Frequency Identification (RFID) tag; and
    using the RFID tag to uniquely identify an object to which the RFID tag is physically linked.

14. A database structure comprising:
    a plurality of related tables normalized in third normal form, said tables including an object table and a collection table;
    the object table comprising an ELECTRONIC PRODUCT CODE (EPC) field, which is a candidate key of the object table, wherein a pure identity of a value associated with the EPC field comprises a serialized portion and a nonserialized portion; and
    the collection table comprising a candidate key having a value equivalent to the nonserialized portion, said object table comprising a collection field having a value equivalent to the nonserialized portion, wherein the collection field is a foreign key relating the object table to the collection table.

15. The database of claim 14, wherein the value in the EPC field is automatically generated for the object table by concatenating the candidate key and an automatically generated serial number.

16. The database of claim 15, further comprising:
    a plurality of different serial number generation functions, each function mapped to a particular value of the nonserialized portion, wherein the database uses a value of the nonserialized portion to determine which of the serial number generation functions is used to generate the automatically generated serial number.

17. The database of claim 15, wherein the automatically generated EPC value is digitally encoded into a Radio Frequency Identification (RFID) tag and is used to uniquely identify an object to which the RFID tag is physically linked.

* * * * *